(12) United States Patent
Seo et al.

(10) Patent No.: US 11,441,637 B2
(45) Date of Patent: Sep. 13, 2022

(54) MODULAR MOUNTING STRUCTURE AND COMBINATION METHOD FOR MANUFACTURING VEHICLE

(71) Applicants: Hyundai Motor Company, Seoul (KR); Kia Motors Corporation, Seoul (KR)

(72) Inventors: Sungwon Seo, Gyeonggi-do (KR); Hai Teng Sui, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 17 days.

(21) Appl. No.: 17/095,575

(22) Filed: Nov. 11, 2020

(65) Prior Publication Data
US 2022/0128119 A1    Apr. 28, 2022

(30) Foreign Application Priority Data

Oct. 23, 2020    (CN) .......................... 202011145104.3

(51) Int. Cl.
*B60K 5/12*    (2006.01)
*F16F 15/02*    (2006.01)

(52) U.S. Cl.
CPC ............ *F16F 15/02* (2013.01); *B60K 5/1208* (2013.01); *F16F 2230/40* (2013.01)

(58) Field of Classification Search
CPC .. B60K 5/1208; F16F 1/3828; F16F 2230/40; F16F 15/02
See application file for complete search history.

(56) References Cited

U.S. PATENT DOCUMENTS

| | | | | |
|---|---|---|---|---|
| 2,076,034 A | * | 4/1937 | Lampman | F16F 3/0873 248/605 |
| 4,504,036 A | * | 3/1985 | Passarell | B60K 5/1208 248/632 |
| 6,321,890 B1 | * | 11/2001 | Suzuki | B60K 5/1208 188/379 |
| 9,057,414 B2 | * | 6/2015 | Kim | F16F 1/3828 |
| 9,765,845 B2 | * | 9/2017 | Bradshaw | B60K 5/1208 |
| 10,428,890 B2 | * | 10/2019 | Shimizu | F16F 15/08 |
| 10,994,595 B2 | * | 5/2021 | Wilhelm | B60K 5/1241 |
| 11,022,195 B2 | * | 6/2021 | Werner | F16F 1/3876 |
| 2020/0116226 A1 | * | 4/2020 | Kojima | F16F 13/1418 |
| 2020/0182327 A1 | * | 6/2020 | Werner | F16F 13/106 |

* cited by examiner

*Primary Examiner* — Bradley Duckworth
(74) *Attorney, Agent, or Firm* — Fox Rothschild LLP

(57) ABSTRACT

A modular mounting structure includes a mount module unit including a mount housing, a mount core with a bolt hole, and a mount insulator connecting the mount housing and the mount core, a first module unit including a first housing, a first core with a bolt hole, and a first insulator connecting the first housing and the first core and having a first direction characteristic, and a second module unit including a second housing, a second core with a bolt hole, and a second insulator connecting the second housing and the second core and having a second direction characteristic.

7 Claims, 9 Drawing Sheets

Second direction

FIG. 9

|       |   | a  | b  | c  |
|-------|---|----|----|----|
|       | W | 0  | 65 | 30 |
| Angle | X | 5  | 70 | 35 |
|       | Y | 10 | 75 | 40 |
|       | Z | 15 | 80 | 45 |

MODULAR MOUNTING STRUCTURE AND COMBINATION METHOD FOR MANUFACTURING VEHICLE

CROSS-REFERENCE TO RELATED APPLICATION

This application claims under 35 U.S.C. § 119 the benefit of Chinese Patent Application No. 202011145104.3 filed in the Chinese National Intellectual Property Administration on Oct. 23, 2020, the entire contents of which are incorporated herein by reference.

BACKGROUND

(a) Technical Field

The present disclosure relates to a modular mounting structure and a combination method for manufacturing a vehicle, more particularly, to the modular mounting structure and the combination method capable of shortening a development period in manufacturing the vehicle.

(b) Description of the Related Art

In general, engines generate significant amounts of vibration due to periodic changes in a central position according to vertical movement of a piston and a connecting rod, an inertia force of reciprocal motion generated in a cylinder axial direction, and periodic change of torque applied to a crankshaft of the connecting rod.

A transmission connected to such an engine not only increases or decreases torque of the engine according to a running state of the vehicle, but also reverses the vehicle, and is structurally always receiving vibration. Therefore, since the transmission is always subjected to vibration like the engine, it is necessary to improve ride comfort of passengers by devising an appropriate vibration isolation means when mounting the transmission to the vehicle body.

These engines and transmissions are referred to as power trains, and are mounted on the vehicle body through an engine mounting unit and a transmission mounting unit supporting each of the vehicle body.

Here, an insulator to insulate vibration is applied to each mounting unit, but the insulator alone is insufficient to adequately absorb complex vibrations that appear widely over a wide frequency band simultaneously.

A typical mounting structure is vulcanically bonded to a core, an outer engaged with the mating part, and includes a rubber for vibration insulation, i.e., an insulator.

The related technology controls the vibration transmission characteristics of the vehicle front/rear direction (X direction) and up and down direction (Z direction) by adjusting thickness, angle, shape and hardness of a bridge of the insulator.

The related technology adjusts the characteristics of the X and Z directions using shapes such as the thickness and angle of the rubber bridge, so in the process of vehicle design and tuning, if the characteristics of the X and Z directions are changed, a new mold is manufactured and the parts are rebuilt.

In addition, whether the newly manufactured product satisfies the durability performance must be verified again and evaluated again in the vehicle to confirm whether performance requirements are satisfied. In addition, if a problem occurred again, there may be problems such as delay in development period, durability performance verification of parts, and delay in actual vehicle evaluation due to the need to rebuild the mold.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a modular mounting structure and a combination method that can shorten a development period when manufacturing a vehicle.

A modular mounting structure according to an exemplary embodiment of the present disclosure may include a mount module unit including a mount housing, a mount core with a bolt hole, and a mount insulator connecting the mount housing and the mount core; a first module unit including a first housing, a first core with a bolt hole, and a first insulator connecting the first housing and the first core and having a first direction characteristic; and a second module unit including a second housing, a second core with a bolt hole, and a second insulator connecting the second housing and the second core and having a second direction characteristic.

The mount module unit, the first module unit and the second module unit may be combined by a protrusions and depressions structure that connects the mount core, the first core, and the second core respectively.

The first insulator may include a first bridge formed in a first direction.

The second insulator may include a second bridge formed in a second direction different from the first direction.

A modular mounting structure according to an exemplary embodiment of the present disclosure may include a mount module unit including a mount housing, a mount core with a bolt hole, and a mount insulator connecting the mount housing and the mount core; a first module unit including a first housing, a first core in which a bolt hole is formed, and a first insulator having a first bridge formed in a predetermined first direction and connecting the first housing and the first core; a second module unit including a second housing, a second core in which a bolt hole is formed, and a second insulator having a second bridge formed in a predetermined second direction and connecting the second housing and the second core; and a third module unit including a third housing, a third core in which a bolt hole is formed, and a third insulator having a third bridge formed in a predetermined third direction and connecting the third housing and the third core.

The mount module unit, the first module unit, the second module unit and the third module unit may be combined by protrusions and depressions structures that connect the mount core, the first core, the second core, and the third core, respectively.

A combination method for the modular mounting structure according to an exemplary embodiment of the present disclosure may include combining the first module unit including the first bridge formed in the predetermined first direction with the mount module unit, combining the second module unit including the second bridge formed in the predetermined second direction with the first module unit, and combining the third module unit including the third bridge formed in the predetermined third direction with the second module unit. In addition, the first, second, and third modules units can be formed and combined in groups.

The mount module unit, the first module unit, the second module unit and the third module unit may be combined by protrusions and depressions structures that connect the mount core, the first core, the second core, and the third core, respectively.

According to the modular mounting structure and the combination method for the same according to an exemplary embodiment of the present disclosure, it is possible to shorten a development period of the mounting structure by using each module unit produced in advance during manufacture of a vehicle.

BRIEF DESCRIPTION OF THE DRAWINGS

FIG. 9 is a table showing a group of module units of a modular mounting structure according to a modified exemplary embodiment of the present disclosure.

DETAILED DESCRIPTION OF THE EMBODIMENTS

Figure 1:
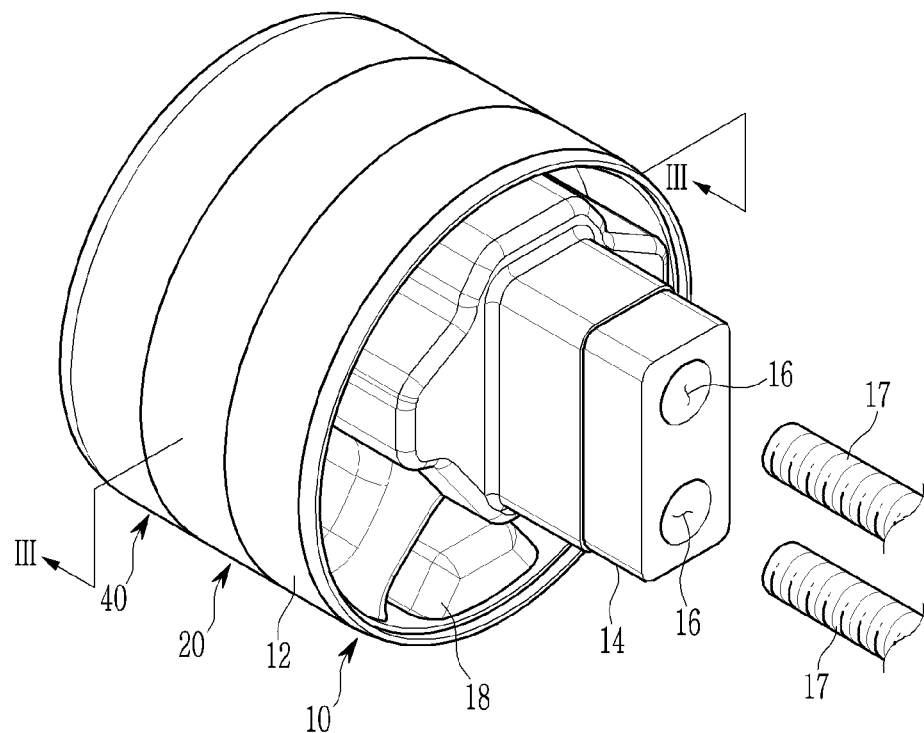
FIG. 1 is a perspective view of a modular mounting structure according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In the following detailed description, only certain exemplary embodiments of the present disclosure have been shown and described, simply by way of illustration.

As those skilled in the art would realize, the described embodiments may be modified in various different ways, all without departing from the spirit or scope of the present disclosure Throughout the specification, parts marked with the same reference number mean the same constituent elements.

In the drawings, the thickness of layers, films, panels, regions, etc., may be exaggerated for clarity.

When a part such as a layer, film, region, or plate is said to be "on" another part, this includes not only the case directly above the other part, but also the case where there is another part in between.

In contrast, when an element is referred to as being "directly on" another element, there are no intervening elements present.

An exemplary embodiment of the present disclosure will hereinafter be described in detail with reference to the accompanying drawings.

Figure 2:
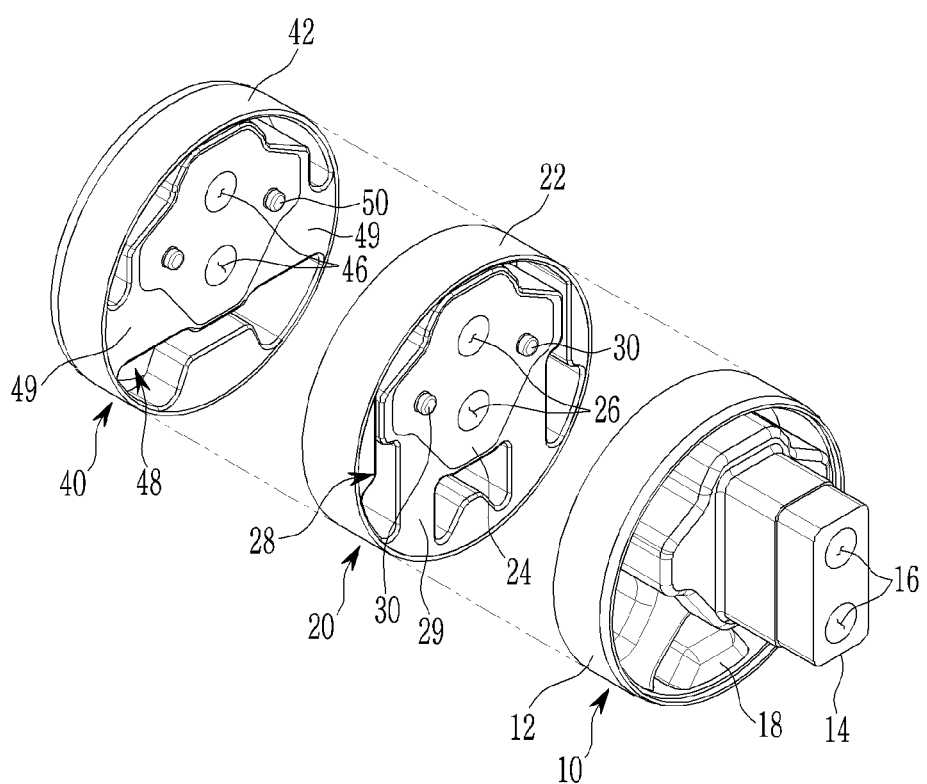
FIG. 2 is an exploded perspective view of a modular mounting structure according to an exemplary embodiment of the present disclosure.
Figure 3:
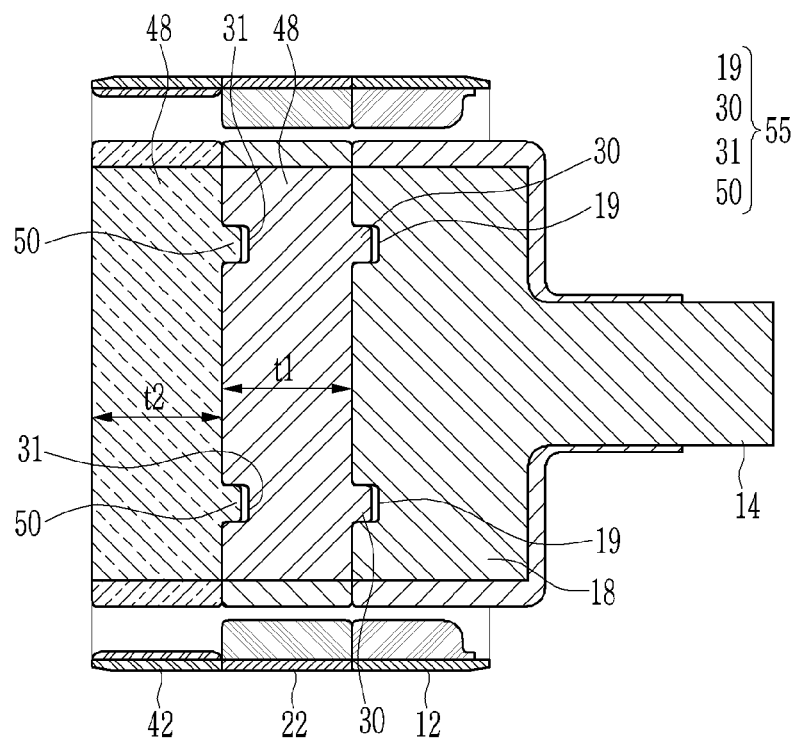
FIG. 3 is cross-sectional view along line III-III of FIG. 1.

FIG. 1 is a perspective view of a modular mounting structure according to an exemplary embodiment of the present disclosure, FIG. 2 is an exploded perspective view of a modular mounting structure according to an exemplary embodiment of the present disclosure, and FIG. 3 is cross-sectional view along line III-III of FIG. 1.

Referring to FIG. 1, a modular mounting structure according to an exemplary embodiment of the present disclosure may be completed by combining a plurality of module units.

For example, the modular mounting structure according to an exemplary embodiment of the present disclosure may be configured by combining a first module unit 20 and a second module unit 40 to a mount module unit 10.

The mount module unit 10 may include a mount housing 12, a mount core 14 in which a bolt hole 16 is formed thereon, and a mount insulator 18 connecting the mount housing 12 and the mount core 14.

By inserting connecting bolt 17 into the bolt hole 16, vehicle parts, for example, an engine, a transmission, etc. can be connected thereto.

The mount insulator 18 is formed of a material capable of reducing vibration, such as rubber, and can be vulcanized with the mount housing 12 and the mount core 14.

The first module unit 20 may include a first housing 22, a first core 24 in which a bolt hole 26 formed thereon, and a first insulator 28 connecting the first housing 22 and the first core 24 and having a first direction characteristic.

The second module unit 40 may include a second housing 42, a second core 44 in which a bolt hole 46 formed thereon, and a second insulator 48 connecting the second housing 42 and the second core 44 and having a second direction characteristic.

The connecting bolt 17 is inserted into each bolt hole 16, 26, and 46 to fix the mount module unit 10, the first module unit 20, and the second module unit 40.

The first insulator 28 and the second insulator 48 are formed of a material that can reduce vibrations, for example, rubber. And the first housing 22 can be vulcanized with the first core 24, and the second housing 42 can be vulcanized with the second core 44, respectively.

The mount module unit 10, the first module unit 20, and the second module unit 40 can be combined by a protrusions and depressions structure 55 that connects the mount core 14, the first core 24, and the second core 44, respectively.

As shown in FIG. 3, a mount module unit connecting hole 19 is formed on the mount module unit 10, a first connecting protrusion 30 is formed on the first module unit 20, and the first connecting protrusion 30 is inserted into the mount module unit connecting hole 19 to be coupled. However, it is not limited to a configuration in which a protrusion is formed on the first module unit 20 and a hole in which the protrusion is inserted is formed on the mount module unit 10, and the opposite configuration is also possible.

In addition, a first module unit connecting hole 31 is formed on the first module unit 20, a second connecting protrusion 50 is formed on the second module unit 40, and the second connecting protrusion 50 is inserted into the first module coupling hole 31 to be coupled. However, it is not limited to a configuration in which a protrusion is formed on the second module unit 40 and a hole in which the protrusion is inserted in is formed on the first module unit 20, and the opposite configuration is also possible.

According to the modular mounting structure of the exemplary embodiment of the present disclosure, by limiting the relative positions of the mount module unit 10, the first module unit 20, and the second module unit 40 through the protrusions and depressions structure 50, position alignment may be easily performed. After connecting each module unit 10, 20, and 40, the connecting bolt 17 is inserted into bolt holes 16, 26, and 46 to assemble each module unit 10, 20, and 40.

In addition, as shown in FIG. 2, e.g., each module unit 10, 20, and 40 is combined in the order of the mount module unit 10, the first module unit 20, and the second module unit 40, but is not limited thereto. That is, the order of combining each module unit 10, 20, and 40 is not limited to what is shown in the drawing.

Figure 4:
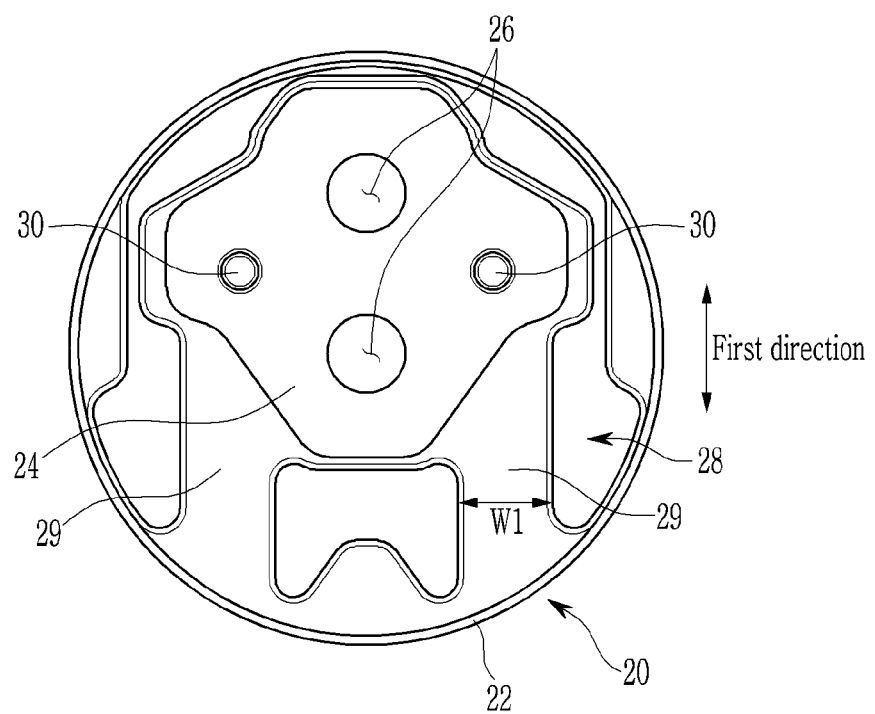
FIGS. 4 and 5 are top plan views of a module unit applicable to a modular mounting structure according to an exemplary embodiment of the present disclosure.
Figure 5:
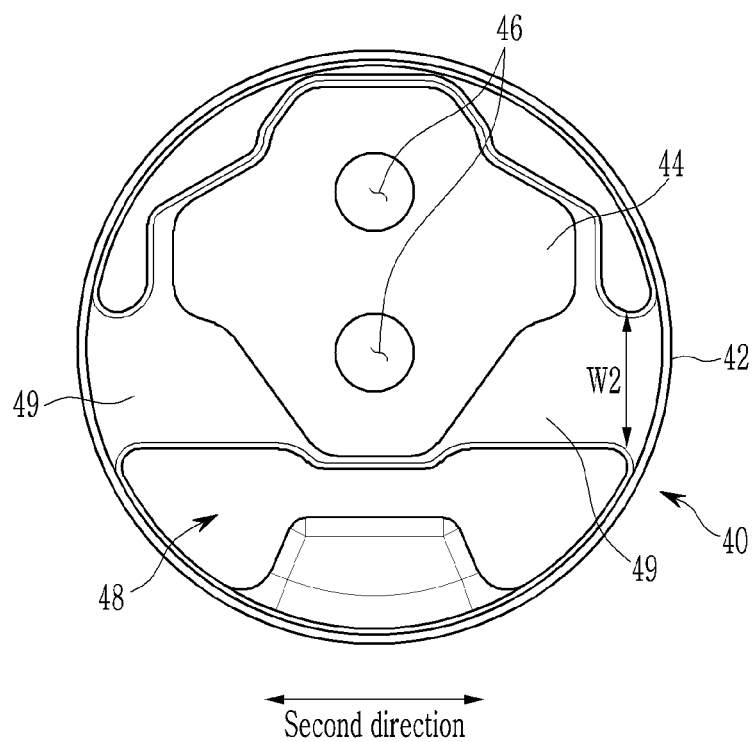

FIGS. 4 and 5 are top plan views of a module unit applicable to a modular mounting structure according to an exemplary embodiment of the present disclosure.

Referring to FIGS. 4 and 5, the first insulator 28 may include a first bridge 29 formed in a first direction, and the second insulator 48 may include a second bridge 49 formed in a second direction different from the first direction.

The first direction may be expressed as, for example, the up and down directions in FIGS. 4 and 5, which is a formation direction of the first bridge 29 that supports a power train including engine and transmission. That is, the first direction can be expressed as a direction related to a vibration characteristic of the power train.

The second direction is, for example, a direction related to noise, vibration, and harshness (NVH) and drivability, and may be expressed as a left and right direction in FIGS. 4 and 5, which is the formation direction of the second bridge 49.

The first direction and the second direction are shown as being vertical to each other in FIGS. 4 and 5, but are not limited thereto.

The modular mounting structure according to an exemplary embodiment of the present disclosure may provide a vibration characteristic suitable for a vehicle to which the modular mounting structure is applied by combining separate module units having different vibration characteristics.

For example, by combining a plurality of first module unit 20 having various insulating characteristics and a plurality of second module unit 40 having various insulating characteristics, a modular mounting structure having an insulating characteristic suitable for the vehicle may be provided.

Various insulation characteristics can be implemented through the shape and material of the insulator, or through the thickness and width of the bridge.

Referring to FIGS. 3 to 5, by adjusting the thickness t1 of the first insulator 28 and the thickness t2 of the second module unit 40, a modular mounting structure with vibration/insulation characteristics suitable for the vehicle can be selected.

In addition, by adjusting the width w1 of the first bridge 29 and the width w2 of the second bridge 49, a modular mounting structure having a vibration/insulation characteristic suitable for the vehicle may be selected.

In other words, it is possible to shorten the time and research period for manufacturing the mold by pre-fabricating a module unit having various vibration/insulation characteristics and selecting a modular mounting structure having a suitable vibration/insulation characteristic for the vehicle by combining them.

In FIGS. 1 to 5, it is explained that three module units are combined to form one modular mounting structure, but is not limited thereto, and it is also possible to form one modular mounting structure by combining various module units.

Figure 6:
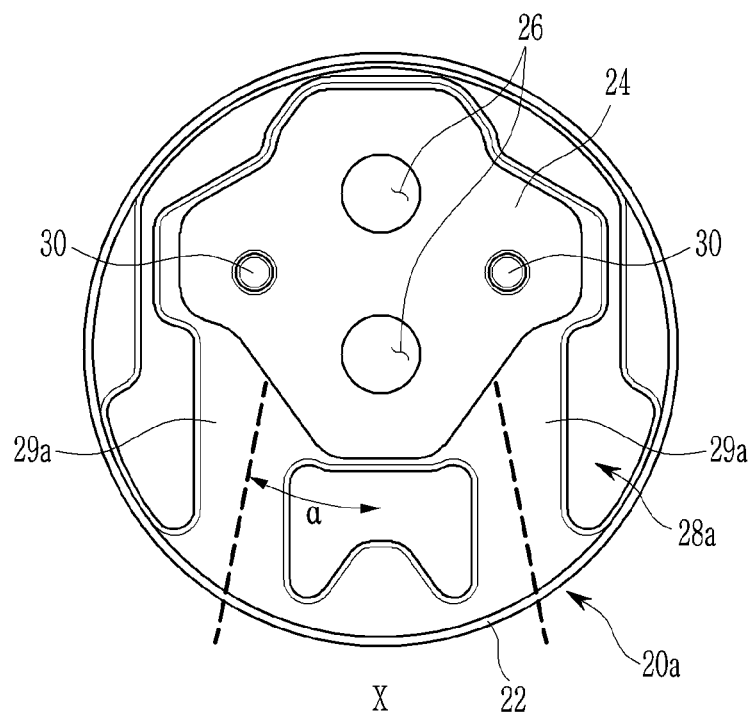
FIGS. 6, 7, and 8 are top plan views of a module unit applicable to a modular mounting structure according to a modified exemplary embodiment of the present disclosure.
Figure 7:
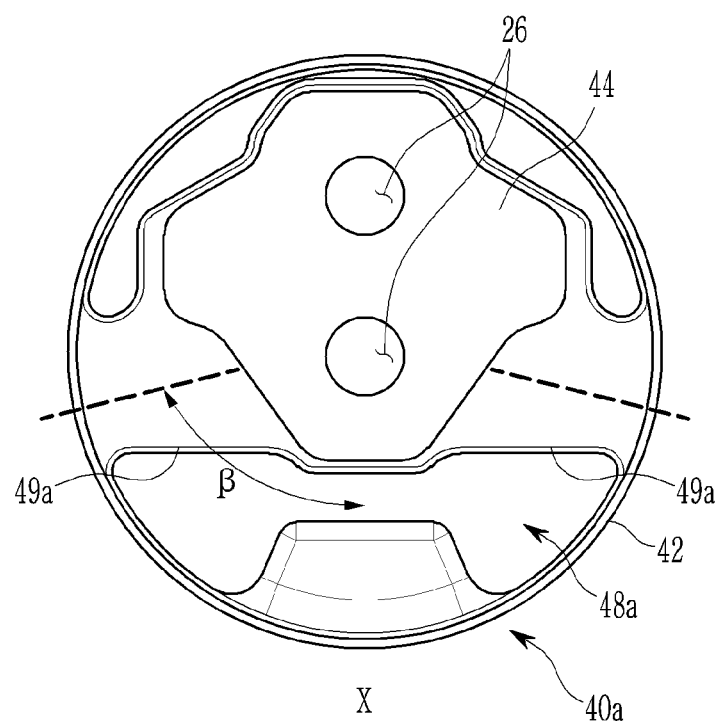
Figure 8:
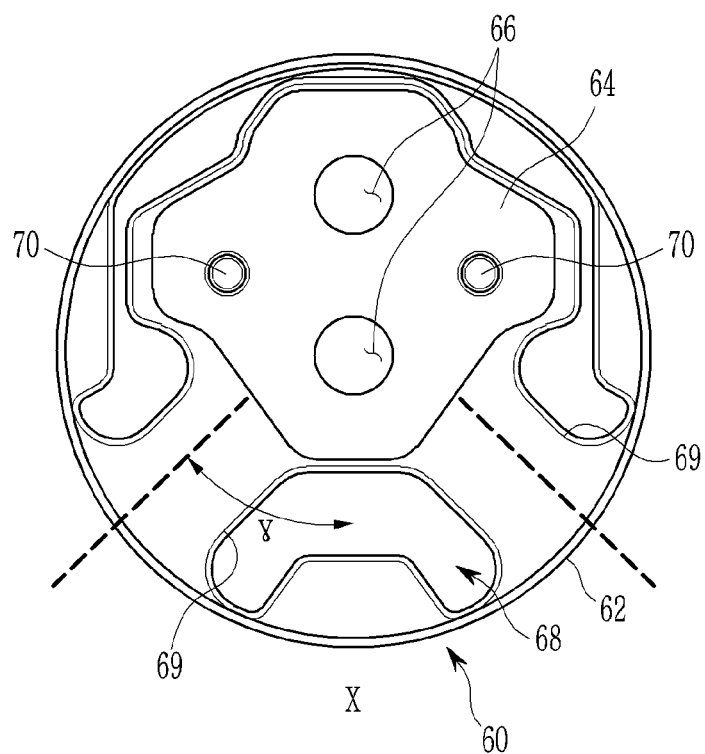

FIGS. 6 to 8 are top plan views of a module unit applicable to a modular mounting structure according to a modified exemplary embodiment of the present disclosure.

FIGS. 6 to 8 generally have the same/similar configurations as an exemplary embodiment of the present disclosure shown in FIG. 1, and thus will use the same/similar reference numbers.

Referring FIGS. 6 to 8, the modular to mounting structure according to a modified exemplary embodiment of the present disclosure may be configured by combining a plurality of module units having various bridge formation directions.

The modular mounting structure according to the modified embodiment of the present disclosure may include the mount module unit 10 including the mount housing 10, the mount core 14 with the bolt hole 16, and the mount insulator 18 connecting the mount housing 12 and the mount core 14, a first module unit 20a including the first housing 22, the first core 24 in which the bolt hole 26 is formed, and a first insulator 28a having a first bridge 29a formed in a predetermined first direction and connecting the first housing 22 and the first core 24, a second module unit 40a including the second housing 42, the second core 44 in which the bolt hole 46 is formed, and a second insulator 48a having a second bridge 49a formed in a predetermined second direction and connecting the second housing 42 and the second core 44, and a third module unit 60 including a third housing 62, a third core 64 in which a bolt hole 66 is formed, and a third insulator 68 having a third bridge 69 formed in a predetermined third direction and connecting the third housing 62 and the third core 64.

The mount module unit 10, the first module unit 20a, the second module unit 40a and the third module unit 60 are combined by protrusions and depressions structures (see FIG. 3) that connect the mount core 10, the first core 24, the second core 44, and the third core 64, respectively. Since the composition and function of the protrusions and depressions structures are the same as described in FIG. 3, a repeated description will be omitted.

Figure 9:
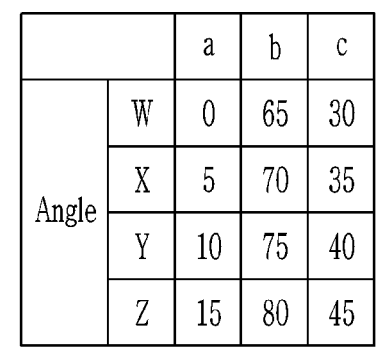

FIG. 9 is a table showing a group of module units of a modular mounting structure according to a modified exemplary embodiment of the present disclosure.

Referring to FIGS. 6 to 9, a combination method for the modular mounting structure according to an exemplary embodiment of the present disclosure may include combining any one of the first module units 20a including the first bridge 29a formed as a group of a predetermined first direction with the mount module unit 10, combining any one of the second module units 40a including the second bridge 49a formed as a group of a predetermined second direction with the first module unit 20a, and combining any one of the third module units 60 including the third bridge 69 formed as a group of a predetermined third direction with the second module unit 40a. In particular, the first, second, and third modules units can be formed and combined in groups.

The combining of each module unit is shown in FIG. 3, for example.

The first bridge 29a, the second bridge 49a, and the third bridge 69 formation angles (a, b, and c in table) may be formed at "α", "β" and "γ" respectively based on X-liner.

The group (W, X, Y, and Z) of the first direction (a) of the first bridge 29a may be, for example, 0, 5, 10, and 15 degrees, and the group (W, X, Y, and Z) of the second direction (b) of the second bridge 49a may be, for example, 65, 70, 75, and 80 degrees, and the group (W, X, Y, and Z) of the third direction (c) of the third bridge 69 may be, for example, 30, 35, 40, and 45 degrees.

In the modular mounting structure according to an exemplary embodiment of the present disclosure, the vibration/insulation characteristic varies according to the combination of the first bridge 29a, the second bridge 49a and the third bridge 69 formed in the first direction (a), the second direction (b) and the third direction (c).

For example, if the current specification is a (W)+b (X)+c (Z) combination, that is, the formation angles of the first bridge 29a, the second bridge 49a and the third bridge 69 are 0 degrees, 70 degrees, and 45 degrees, respectively, and if the test result turns out to have to lower the characteristic (up and down direction) of the x direction, the combination can be changed to a combination of a(W)+b(W)+c(W).

That is, in the modular mounting structure according to an exemplary embodiment of the present disclosure, each module unit is preset and a mounting structure having various vibration/insulation characteristics can be formed by a combination of these module units. For example, according to the table shown in FIG. 9, it is possible to combine 64 mounting structures.

Unlike the general development process, the modular mounting structure according to an exemplary embodiment of the present disclosure enables a combination of various mounting structures without producing a new mold, thereby reducing investment costs and enabling quick tuning during the development process.

In addition, since the modular mounting structure according to an exemplary embodiment of the present disclosure may be applied to various vehicle types by a combination of module units, it is not necessary to manufacture a new mold for each vehicle type, thereby reducing development time.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A modular mounting structure comprising:
    a mount module unit including a mount housing, a mount core with a bolt hole, and a mount insulator connecting the mount housing and the mount core;
    a first module unit including a first housing, a first core with a bolt hole, and a first insulator connecting the first housing and the first core; and
    a second module unit including a second housing, a second core with a bolt hole, and a second insulator connecting the second housing and the second core,
    wherein the mount module unit, the first module unit, and the second module unit are combined by a protrusions and depressions structure that connects the mount core, the first core, and the second core respectively.

2. The modular mounting structure of claim 1, wherein the first insulator comprises a first bridge formed in a first direction.

3. The modular mounting structure of claim 2, wherein the second insulator comprises a second bridge formed in a second direction different from the first direction.

4. A modular mounting structure comprising:
    a mount module unit including a mount housing, a mount core with a bolt hole, and a mount insulator connecting the mount housing and the mount core;
    a first module unit including a first housing, a first core in which a bolt hole is formed, and a first insulator having a first bridge formed in a predetermined first direction and connecting the first housing and the first core;
    a second module unit including a second housing, a second core in which a bolt hole is formed, and a second insulator having a second bridge formed in a predetermined second direction and connecting the second housing and the second core; and
    a third module unit including a third housing, a third core in which a bolt hole is formed, and a third insulator having a third bridge formed in a predetermined third direction and connecting the third housing and the third core.

5. The modular mounting structure of claim 4, wherein the mount module unit, the first module unit, the second module unit, and the third module unit are combined by protrusions and depressions structures that connect the mount core, the first core, the second core, and the third core, respectively.

6. A assembling method for the modular mounting structure of claim 4, the assembling method comprising:
    combining the first module unit including the first bridge formed in the predetermined first direction with the mount module unit;
    combining the second module unit including the second bridge formed in the predetermined second direction with the first module unit; and
    combining the third module unit including the third bridge formed in the predetermined third direction with the second module unit.

7. The assembling method of claim 6, wherein the mount module unit, the first module unit, the second module unit and the third module unit are combined by protrusions and depressions structures that connect the mount core, the first core, the second core, and the third core, respectively.

* * * * *